INVENTOR.
ALAN L. HELGESSON
BY Wm J Nolan
ATTORNEY

INVENTOR.
ALAN L. HELGESSON
BY
ATTORNEY 3,408,591

TIME SCALE CHANGER FOR ATOMIC STABILIZED FREQUENCY SOURCES

Alan L. Helgesson, Los Altos Hills, Calif., assignor to Varian Associates, Palo Alto, Calif., a corporation of California Filed Sept. 16, 1966, Ser. No. 579,939
11 Claims. (Cl. 331—3)

ABSTRACT OF THE DISCLOSURE

A first oscillator operated to provide a first frequency signal is coupled to a phase modulator and a fixed divider. The divider provides a signal which triggers a sample pulse generator to generate a pulse train. A second oscillator provides a second frequency signal which is adjustable in steps of a selected frequency increment being equal to the pulse repetition rate of the pulse train generated by the sample pulse generator. The frequency signals from the first and second oscillators are coupled to a mixer which provides a signal having a frequency equal to the difference of the frequency signals. The difference frequency signal is coupled to a phase-to-voltage comparator which is gated by the pulses of the pulse train to provide a DC voltage proportional to the amplitude of the difference frequency signal during the presence of the pulse at the comparator. The DC voltage is coupled to lock the second oscillator to the second frequency. Frequency multipliers, dividers and mixers receive the frequency signals from the oscillators and provide a frequency modulated signal having a center frequency corresponding to a hyperfine resonance frequency of an atomic frequency resonator. The frequency modulated signal is coupled to initiate hyperfine energy state transitions in the resonator. The transitions are monitored to generate an error signal to lock the first oscillator to the first frequency.

Figure 2:
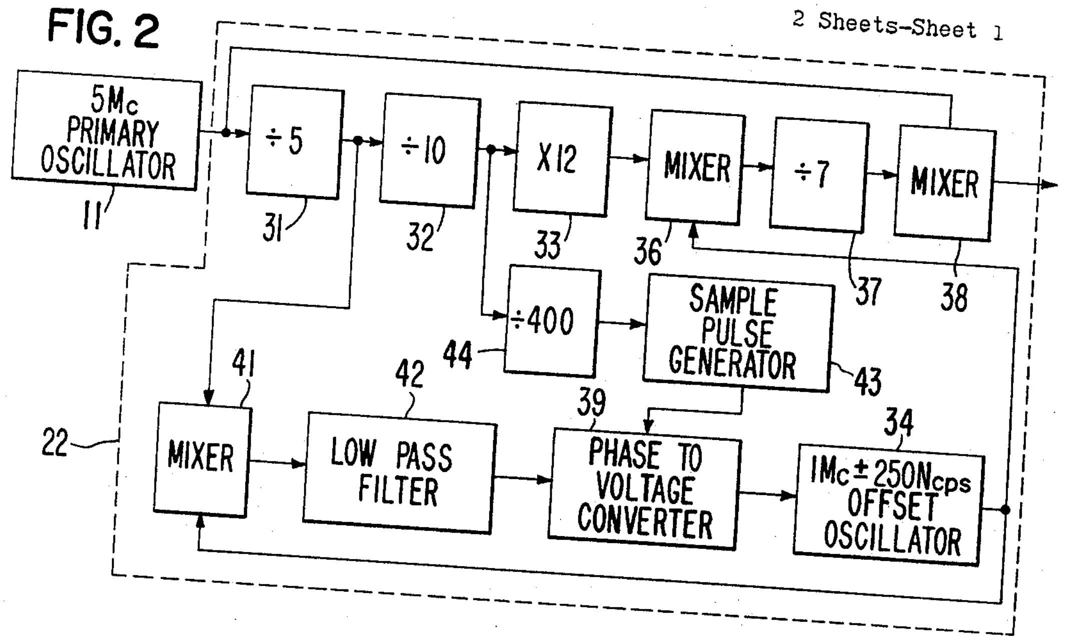

The present invention relates to atomic stabilized frequency sources, and more particularly, to an atomic stabilized frequency source whose output frequency can be selectively offset.

Frequency sources stabilized by quantum mechanical atomic state transition resonances, for example, a hyperfine transition resonance frequency, are used for a variety of purposes, some of the more notable being for producing atomic clock frequency standards, stabilizing oscillators of frequency standards, measuring the earth's magnetic field, and for analyzing the structure of atoms. In such applications, the output of the frequency source is synthesized for comparison to a particular hyperfine resonance frequency of the atomic frequency resonator. A control signal is derived from the comparison to control the frequency of the frequency source. In standard practice, either the absorption, transmission, or emission characteristics of the resonant medium of passive or active atomic frequency resonators is monitored to provide the control signal. In atomic clock and oscillator stabilization applications, the frequency signals are compared to generate an error signal to lock the output frequency of the frequency source to a selected frequency. U.S. Patent 3,246,254, issued on Apr. 12, 1966, to W. E. Bell et al., and U.S. Patent 3,159,797, issued on Dec. 1, 1964 to R. M. Whithorn, both assigned to the assignee of this application, describe typical atomic stabilized frequency source systems used in atomic clocks which employ alkali vapor optical absorption cell resonators.

In practice, often it is desirable, and in some cases necessary, to adjust the controlled frequency source to different frequencies. For example, in atomic applications, the frequency signal provided by the controlled frequency source serves as a measure of time relative to the current ephemeris time scale as indicated by an internationally recognized time scale, for example, the universal time scale UT–2 established by the U.S. Naval Observatory. Unfortunately, the ephemeris time scale relative to earth does not remain fixed. To correct for changes in the ephemeris time scale, the internationally recognized time scales are adjusted, usually in increments of 50 parts in $10^{10}$. Consequently, it is necessary to adjust the output frequency of the atomic clock frequency standard in order to maintain an accurate measure of time. However, since the techniques of adjusting the hyperfine resonance frequency of a particular hyperfine atomic energy state transition of atomic frequency resonators are complicated and inconvenient, it is preferred to adjust the frequency of the controlled source without altering the steady state frequency signal generated by the atomic frequency resonator.

An atomic stabilized frequency source whose output frequency can be offset by selected increments in the above preferred manner is described in U.S. patent application Ser. No. 528,649, filed Feb. 18, 1966, inventor being J. T. Arnold, and assigned to the assignee of this application, issued Jan. 9, 1968 as U.S. Patent 3,363,193. In the atomic stabilized frequency source described, a vapor optical absorption cell atomic frequency resonator is coupled to an adjustable frequency synthesizer which transforms a selected frequency signal issuing from a primary frequency source to a frequency corresponding to that of a selected hyperfine atomic state transition. The transformed frequency signal is employed to initiate atomic state transitions in the resonant medium of the cell, and the optical transparency is monitored to develop an error signal which, by standard feedback techniques, is coupled to lock the output of the primary frequency source to the selected frequency. The output of the primary frequency source serves as a measure of time. To adjust the output frequency of the primary frequency source in accordance with time scale changes, the frequency synthesizer is adjusted to transform the source frequency signal to the hyperfine transition frequency by a new and different increment. Since this introduces an error signal in the closed loop defined by the absorption cell, optical monitoring apparatus and the primary frequency source, the output frequency of the primary frequency source is caused to change until the error signal is reduced to zero. However, the adjustable frequency synthesizer employed requires two separate adjustments in order to effect the primary frequency source adjustment.

The present invention provides an atomic stabilized frequency source employing a simplified adjustable frequency synthesizer which requires but a single adjustment to effect an incremental adjustment of the output frequency of the source. The simplified incremental frequency adjustment of the output of the atomic stabilized frequency source is accomplished by employing an unique phase-to-voltage converter operatively associated with an offset oscillator adjustable in steps of a selected frequency increment to determine the frequency transformation performed by the frequency synthesizer. More specifically, the frequency signal to be compared with a selected hyperfine resonance frequency of an atomic frequency resonator is generated by deriving from a primary oscillator, which serves as the frequency source, a pulse train having a pulse repetition rate proportional to the incremental frequency step by which the primary oscillator frequency is adjusted. The pulse train is coupled to a phase-to-voltage converter to gate the converter to sample the voltage amplitude of a frequency signal provided by the adjustable offset oscillator. The offset oscillator provides a frequency signal of $f_0$ cycles per second (c.p.s.) adjustable in steps of $\pm Nf_i$, where $f_i$ is equal to the pulse repetition rate of the pulse train and N is an integer. If the frequency of the offset oscillator varies from the selected frequency, the sampled voltage amplitude changes accordingly. This sampled voltage is coupled to lock the offset oscillator to the desired output frequency. The control signal for the primary oscillator is generated by combining output frequencies derived from the offset oscillator and primary oscillator, and comparing the resultant transformed frequency signal to a particular hyperfine resonance frequency of an atomic frequency resonator. To accomplish a selected incremental adjustment of the frequency of the primary oscillator, it is necessary only to adjust the frequency of the offset oscillator.

Accordingly, it is an object of this invention to provide an atomic stabilized frequency source whose output frequency can be selectively offset.

More particularly, it is an object of this invention to provide an atomic stabilized frequency source for use as a frequency standard whose output frequency can be offset by selected increments.

Another object of this invention is to provide an atomic stabilized frequency source for use in an atomic clock whose output frequency can be offset by selected increments to account for changes in the time scale of the ephemeris time scale.

Still a further object of this invention is to provide an adjustable frequency synthesizer for transforming the frequency of an atomic stabilized frequency source by selected increments which requires but a single adjustment to effect an incremental adjustment of the output frequency of the stabilized frequency source.

Yet another object of this invention is to provide an adjustable frequency synthesizer for use in atomic clocks capable of effecting adjustment of the frequency of the atomic clock frequency source by selected increments of tens of parts per $10^{10}$.

Figure 1:
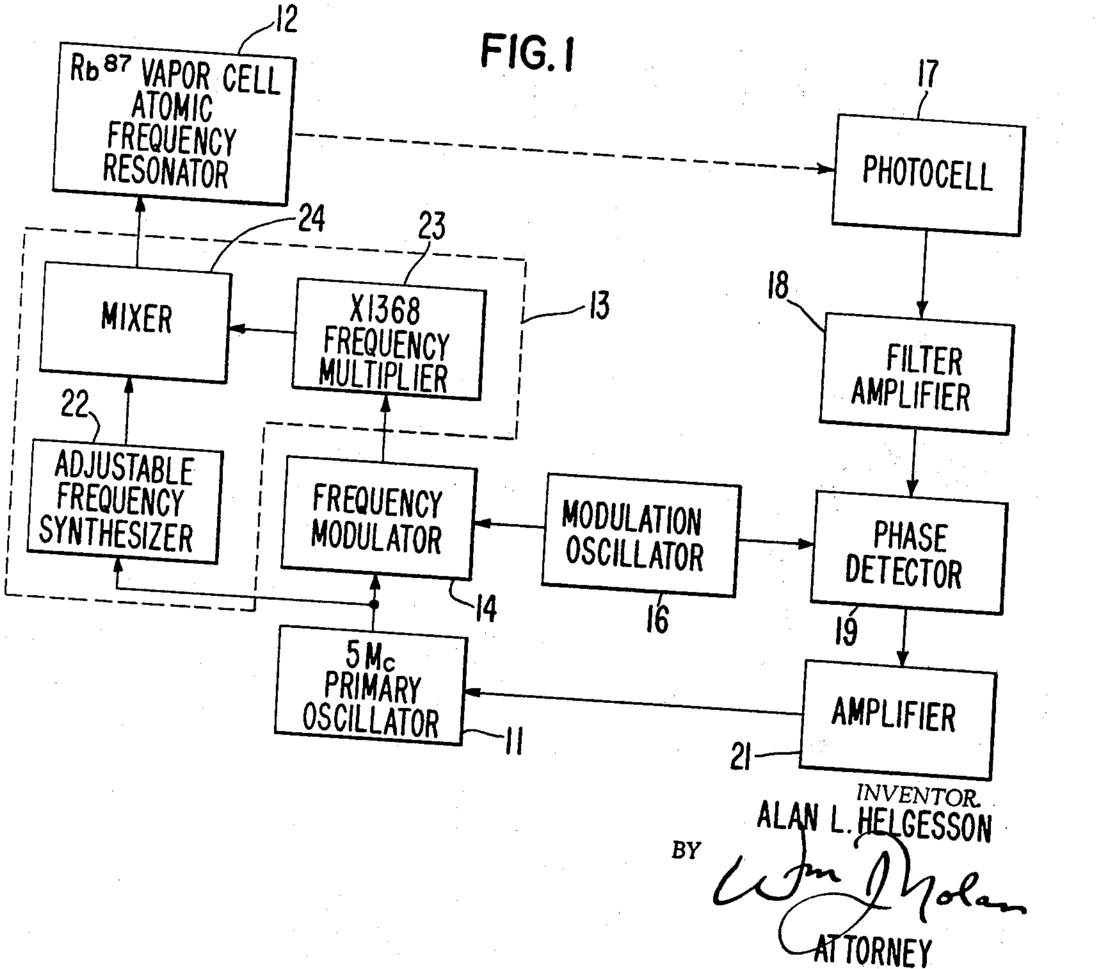
Figures 3, 4:
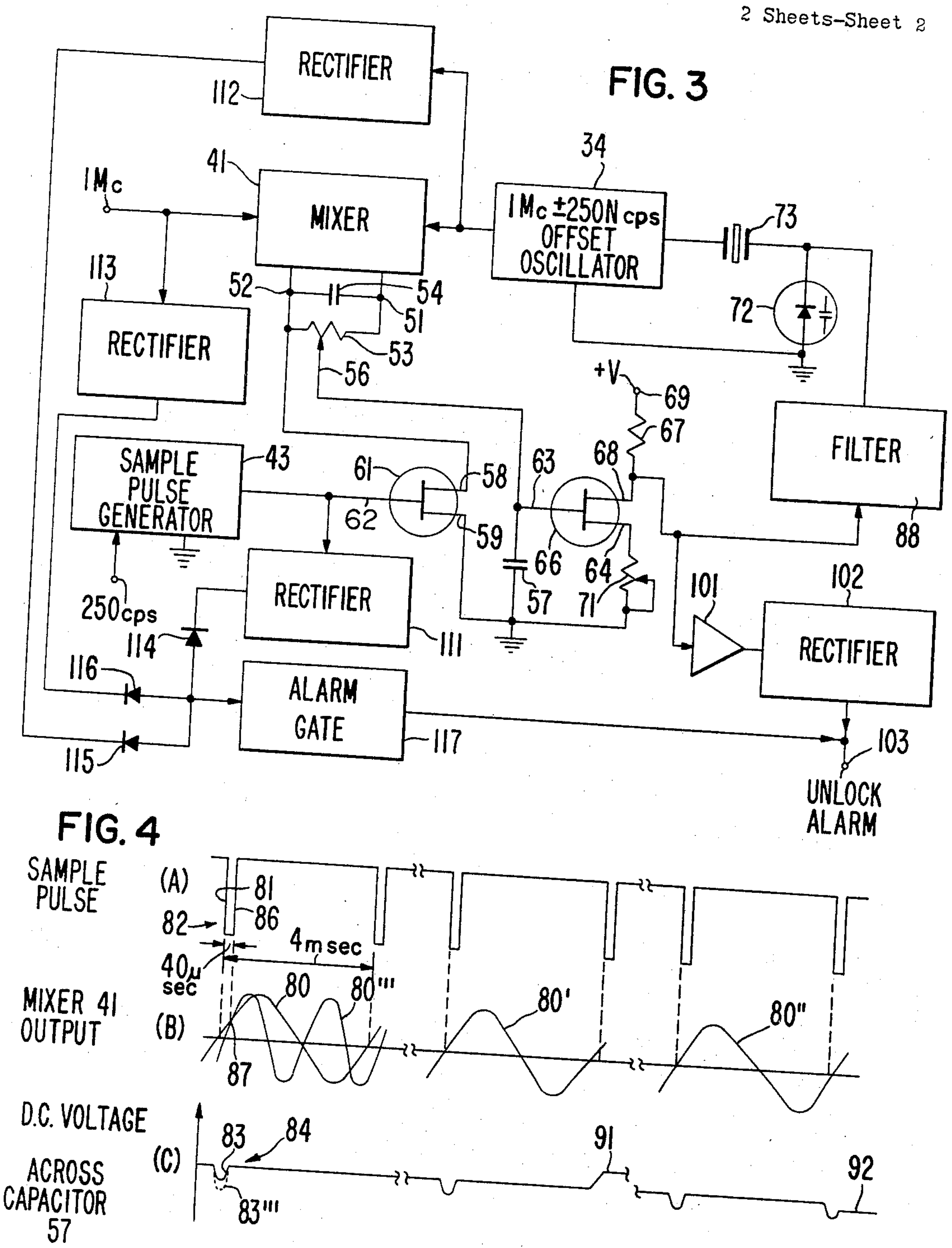

These and other objects and advantages of the present invention will become more apparent upon consideration of the following specification and claims in conjunction with the accompanying drawings wherein:

FIG. 1 is a block diagram of an atomic clock frequency standard embdiment of the present invention employing the adjustable frequency synthesizer, FIG. 2 is a block diagram of the adjustable frequency synthesizer employed in the atomic stabilized frequency source system of the present invention, FIG. 3 is a schematic diagram, partly in block form of a phase-to-voltage converter control circuit employed in the adjustable frequency synthesizer of FIG. 2, FIG. 4 si a graph illustrating the operation of the phase-to-voltage converter control circuit of FIG. 3 with graph (*a*) showing the sample control pulse train derived from the 5 megacycle (mc.) primary oscillator, (*b*) showing the output signal derived from the adjustable offset oscillator, and (*c*) the DC control voltage employed to lock the offset oscillator to a selected frequency.

With reference to FIG. 1, a 5 mc. primary oscillator 11 is stabilized by an optically pumped $Rb^{87}$ vapor optical absorption cell passive atomic frequency resonator 12 to provide an atomic clock frequency standard. The primary oscillator 11 is stabilized by coupling its output to a frequency synthesizer 13 which is arranged to transform the 5 mc. signal by a selected increment to a frequency equal to a hyperfine resonance frequency corresponding to selected atomic state energy transitions of the absorption cell 12. Preferably, the $F=2$, $m_f=0 \rightarrow F=1$, $m_f=0$ first order magnetic field independent transition of the $Rb^{87}$ atoms is employed to stabilize the 5 mc. primary oscillator 11. In a vacuum, the normal resonant frequency of this $Rb^{87}$ atomic state energy transition is 6,834,682,614 c.p.s.

The transformed frequency signal issuing from frequency synthesizer 13 is coupled to excite the absorption cell to induce the pumped $Rb^{87}$ atoms to undergo atomic state transitions from the pumped optically opaque energy state $F=2$, $m_f=0$ to the optically transparent energy state $F=1$, $m_f=0$. As the number of $Rb^{87}$ atoms in the pumped state varies, the intensity of the light transmitted through the absorption cell 12 varies, with the intensity inversely proportional to the number of $Rb^{87}$ atoms in the pumped state. The primary oscillator 11 is locked to 5 mc. by monitoring the intensity of light transmitted through the absorption cell 12 and developing an error signal which adjusts the frequency of oscillator 11 until the light transmitted through cell 12 is minimized. Of course, if other passive atomic frequency resonators are employed, e.g., cesium beam tubes, different techniques would be required to monitor the atomic state transitions for deriving the error signal. Furthermore, when active atomic state resonators are employed, the primary oscillator would not be coupled to the resonator to induce the atomic state transitions. Instead, a frequency signal derived from the atomic frequency resonator 12 would be compared by mixing techniques to one derived from the primary oscillator 11 to develop an error signal to lock the primary oscillator to the desired frequency.

To accurately lock the primary oscillator 11 to the desired output frequency, frequency modulation techniques are employed to develop the error signal. The output of the principal oscillator 11 is coupled to a frequency modulator 14 and is modulated by a 107 c.p.s. modulation signal generated by modulation oscillator 16. For extreme accuracy, a half wave symmetrical waveform, for example, a square wave, is employed as the modulation signal. Such a system is the subject of the above noted U.S. Patent 3,159,797. Because the modulation is accomplished more easily at lower frequencies, the frequency modulation is performed prior to transforming the 5 mc. oscillator frequency to the hyperfine resonance frequency.

Since the atomic frequency resonators have an atomic state transition characteristic which has a resonance curve of a finite width, generally a full-width-half-maximum of about 150 c.p.s., the frequency modulated transition inducing signal will cause the number of transitions to vary in accordance with the instantaneous frequency deviation of the frequency modulated transition inducing signal. If the frequency of the derived transition inducing signal corresponds to the hyperfine transition resonance center frequency of the atomic frequency resonator 12, the number of transitions occurring will be maximum. Whereas, if the frequency of the transition inducing signal is less or greater than the hyperfine transition resonance center frequency, the number of transitions occurring will be less than maximum by an amount representative of the frequency difference. Thus, more transitions will occur at the beginning or end of a period defined by the frequency of modulation depending on whether the center frequency of the frequency modulated signal is less or greater than the hyperfine transition resonance center frequency.

The time distribution of the transitions is monitored by directing the unabsorbed light emerging from the resonator 12 to a photocell 17. If the center frequency of the transition inducing signal coincides with the hyperfine transition resonance center frequency, an intensity pulsating light of constant pulse amplitude at a frequency equal to two times the phase modulation frequency is transmitted through absorption resonator 12 and impinges photocell 17. If the center frequency of the transition inducing signal is either greater or less than the resonance center frequency, an intensity pulsating light of alternately large and small amplitude pulses is transmitted through resonator 12 to impinge photocell 17, with the frequency of the pulse amplitude variation being equal to the modulation frequency. The amplitude difference between the large and small amplitude pulses is transmitted through frequency difference between the center frequencies, while the sequence of appearance of the different amplitude pulses, i.e., large first or small first, defines which side of the resonance center frequency the center frequency of the frequency modulated transition inducing signal lies.

A filter amplifier 18 is connected to the photocell 17 and amplifies only that component of the photocell output signal which corresponds to the modulation frequency. The phase and amplitude of the amplified frequency signal issued by amplifier 18 is compared in a phase detector 19 with the phase of the modulation signal generated by modulation oscillator 16. The output of the phase detector 19 is a DC error voltage whose magnitude is proportional to the amount of difference between the center frequencies, and whose sense indicates whether the center frequency of the transition inducing signal is greater or less than the resonance center frequency. For example, the phase detector 19 can be arranged so that positive error voltages are issued therefrom when the center frequency of the transition inducing signal is greater than the resonance center frequency, and so that negative error voltages are issued when the opposite is true.

The DC error voltage issuing from phase detector 19 is amplified by an operational amplifier 21 and coupled to control oscillator 11, for example, a voltage controlled crystal type oscillator. The error voltage signals alter the resonant frequency of the crystal and, hence, shift the frequency of the oscillator 11 until the error voltage is reduced to zero, i.e., the center frequency of the transition inducing signal and the center frequency of the hyperfine transition resonance coincide. Apparatus for accomplishing the foregoing are described in detail and are the subject of the above identified Patents 3,246,254 and 3,159,797.

In order to selectively offset the frequency of the primary oscillator 11 by selected increments, frequency synthesizer 13 is rendered adjustable to transform the primary oscillator frequency by a selected new increment to provide an offset transition inducing signal frequency. Since any change in the increment by which synthesizer 13 transforms the frequency of oscillator 11 causes an offset in the transition inducing frequency signal, the transition inducing and resonance center frequencies will be out of coincidence. Hence, an error signal will be generated which shifts the oscillator frequency a proportionate increment to bring the center frequencies back into coincidence. To accomplish this incremental frequency adjustment, frequency synthesizer 13 includes an adjustable frequency synthesizer 22 which transforms the output frequency, $f_p$, of the primary oscillator 11 by a selected increment to a frequency signal, $f_1$. The frequency modulated frequency signal derived from the primary oscillator 11 also is transformed to have a new center frequency, $f_2$, by a fixed frequency multiplier 23. The atomic state transition inducing frequency modulated frequency signal is obtained by summing the $f_1$ and frequency modulated $f_2$ frequency signals in a mixer 24. Where an $Rb^{87}$ vapor absorption cell resonator 12 is employed, the adjustable frequency synthesizer 22 and multiplier 23 are arranged so that the summation of $f_1$ and $f_2$ provides a frequency modulated transition inducing signal having a steady state center frequency, $f_t$, of $6,834\frac{24}{35}$ mc., which frequency coincides with the hyperfine transition resonance center frequency of the $0\rightarrow0$ transition of $Rb^{87}$.

It is noted the $6,834\frac{24}{35}$ mc. does not exactly correspond to the natural hyperfine $0\rightarrow0$ transition resonance frequency of $Rb^{87}$. The difference is due to the presence of a buffer gas and an axial magnetic field. The magnetic field and buffer gas pressure are adjusted in accordance with standard practice to adjust the $0\rightarrow0$ hyperfine transition resonance frequency to a value so that simple frequency synthesizers can be employed.

From the foregoing, it is seen that as the frequency, $f_p$, of the principal oscillator 11 is changed, the frequency signal, $f_1$, issuing from the adjustable frequency synthesizer 22, and the center frequency, $f_2$, of the frequency modulated signal issuing from multiplier 23 varies proportionately thereto. However, by making $f_1 \ll f_2$, the change in $f_1$ can be neglected. Hence, for convenience, the frequency operated on by the adjustable frequency synthesizer 22 always will be considered to be the 5 mc. frequency.

With particular reference to FIG. 2, the adjustable frequency synthesizer 22 generates, from the output of the 5 mc. primary oscillator 11, an $f_1$ frequency signal equal to $5\frac{11}{35}$ mc.$\pm\frac{250}{7}$ N c.p.s., where $5\frac{11}{35}$ mc. is the base frequency about which selected frequency adjustments in steps of $\pm\frac{250}{7}$ N c.p.s. are made, and where N represents an integer, for example, between 0 and 40. The 5 mc. signal from the primary oscillator 11 is coupled to serially connected divide-by-five divider 31, divide-by-ten divider 32, and a times-twelve frequency multiplier 33 which coact to provide a 1.2 mc. output signal. A phase locked adjustable offset oscillator 34 provides a 1 mc. output signal adjustable in incremental steps of 250 c.p.s. which is added to the 1.2 mc. output signal in a first upper single sideband balanced modulator mixer 36. The output of mixer 36 is a 2.2 mc.$\pm$250 N c.p.s. frequency signal. The output of mixer 36 is coupled to a divide-by-seven frequency divider 37 to provide an $\frac{11}{35}$ mc.$\pm\frac{250}{7}$ N c.p.s. output signal for adding to the 5 mc. output signal from oscillator 11 to provide the $f_1$ frequency signal at $5\frac{11}{35}$ mc.$\pm\frac{250}{7}$ N c.p.s. This addition is performed in a second upper single sideband balanced modulator mixer 38. In the most preferred embodiment, digital frequency multipliers and dividers are employed to perform the frequency division and multiplication.

The $5\frac{11}{35}$ mc.$\pm\frac{250}{7}$ N c.p.s. frequency signal is coupled to a lower single sideband balanced modulator mixer 24 to be subtracted from the $f_2$ frequency signal output provided by a 1,368 frequency multiplier 23 to thereby generate a frequency modulated transition inducing signal having a center frequency of 1,368 $f_p$ mc.$-5\frac{11}{35}$ mc.$\pm\frac{250}{7}$ N c.p.s. As noted supra, when the center frequency of the transition inducing signal is offset, the resulting error signal generated will cause the frequency, $f_p$, of the primary oscillator 11 to be varied until the center frequency of the transition inducing signal becomes equal to $6,834\frac{24}{35}$ mc. Hence, under steady state conditions, the transition inducing signal will be maintained at $6,834\frac{24}{35}$ mc. However, during transient operating conditions, i.e., during the operating period that the incremental adjustment in the frequency, $f_p$, of the primary oscillator 11 takes place, the center frequency, $f_2$, of the transition inducing signal will be altered from $6,834\frac{24}{35}$ mc. by an amount equal to the total incremental adjustment of the frequency issuing from the adjustable frequency synthesizer 22, i.e., $\frac{250}{7}$ N c.p.s. Furthermore, a frequency modulated transition inducing signal having a center frequency of $6,834\frac{24}{35}$ mc. which can be offset by increments of $\pm\frac{250}{7}$ could also be obtained by multiplying the output of the primary oscillator 11 to a center frequency of 6,830 mc. and adjusting the adjustable frequency synthesizer 32 to provide a $4\frac{24}{35}$ mc.$\pm\frac{250}{7}$ N c.p.s. signal which would be added to the 6,830 mc. frequency signal. In all cases, the output of mixer 24 is coupled to induce atomic state transitions in the $Rb^{87}$ vapor absorption cell resonator 12.

The adjustable frequency synthesizer 22 is adjusted to transform the 5 mc. output frequency of the primary oscillator 11 by a selected total increment of $\frac{250}{7}$ N c.p.s. by offsetting the frequency of offset oscillator 34 a corresponding increment of 250 N c.p.s. For accuracy, a voltage controlled crystal oscillator is employed to generate the 1 mc.$\pm$250 N c.p.s. signal. To lock the offset oscillator 34 to the desired frequency, a frequency signal equal to the total increment by which the output frequency of the offset oscillator 34 is offset, i.e., 250 N c.p.s. is derived from the output of the offset oscillator 34. The derived offset frequency signal is coupled to a phase-to-voltage converter 39 whereat it is phase analyzed to generate a DC control voltage for locking the offset oscillator 34 to the desired frequency. More specifically, the 1 mc.±250 N c.p.s. output signal from offset oscillator 34 is coupled to a lower single sideband balanced modulator mixer 41 and mixed with a 1 mc. signal from the divide-by-five frequency divider 31 to provide the 250 N c.p.s. difference frequency signal. Because of the large separation between the 1 mc. signal, the sum frequency signal of 1 mc.+250 N c.p.s., and the difference frequency signal of 250 N c.p.s., a standard simple low pass filter 42 can be employed to prevent the undesirable frequency signals from passing to the converter 39.

The phase of the 250 N c.p.s. frequency signal is sampled by coupling the output of the low pass filter 42 to a gated phase-to-voltage converter 39. The converter 39 is gated to sample the 250 N c.p.s. frequency signal by pulses from a 250 c.p.s. pulse train generated by a sample pulse generator 43. The pulse generator is controlled by a divide-by-four hundred digital frequency divider 44 which converts the 100 kilocycle (kc.) output signal from the divide-by-ten frequency divider 32 to a 250 c.p.s. frequency signal. It is to be noted that the pulse repetition rate of the pulse train issued by sample pulse generator 43 is set to be equal to the base incremental step frequency, i.e., 250 c.p.s., by which the offset oscillator 34 is adjusted.

As a pulse from the pulse train gates the converter 39, a DC voltage is generated which is proportional to the voltage amplitude of the 250 N c.p.s. signal which occurs in coincidence with the gate pulse. If the offset oscillator 34 deviates from the selected frequency, the phase point at which the 250 N c.p.s. frequency signal is sampled varies with each sample. Hence, the DC output voltage from converter 39 changes proportionately to the change in phase. This DC voltage is coupled to the voltage controlled crystal offset oscillator 34 to lock the offset oscillator to the desired frequency. When the offset oscillator 34 is locked to the desired frequency the DC voltage generated will be at a level indicating a locked condition.

A unique phase-to-voltage converter 39 for locking the offset oscillator 34 is illustrated in FIG. 3. Mixer 41 is provided with output terminals 51 and 52 across which is connected a parallel combination of a 2KΩ potentiometer 53 and 8200 pf. filter capacitor 54. The voltage developed across potentiometer 53 follows the instantaneous voltage amplitude of the 250 N c.p.s. frequency signal issued by mixer 41. The wiper arm 56 and one side of potentiometer 53 are connected in series with a 0.01 mf. capacitor 57 and the drain 58 and source 59 electrodes of a sampler field effect transistor 61. The sampler 61 and capacitor 57 comprises the phase-to-voltage converter 39. A field effect transistor was selected to serve as the sampler 61 of the converter because of its exceedingly high off impedance, on the order of hundreds of megohms, and its low on impedance of about a kilohm.

The gate electrode 62 of the field effect transistor is connected to receive the pulse train generated by the sample pulse generator 43. The sample pulse generator employs a monostable multivibrator to generate a pulse train comprising 40 microsecond wide negative pulses at 4 millisecond intervals. However, other pulse generating means, e.g., triggered set-reset flip-flops, could be employed equally as well. The sample pulse generator 43 pulses gate sampler 61 into conduction thereby allowing capacitor 57 to follow the voltage appearing at the wiper arm 56 of potentiometer 53.

The capacitor 57 is connected in series with the gate electrode 63 and source electrode 64 of a field effect transistor DC amplifier 66 which forms the DC control voltage for locking the offset oscillator 34 to the desired frequency. A field effect transistor is selected for DC amplifier 66 because of its high input impedance of about tens of megohms. Hence, the high off and input impedance characteristics of the field effect transistors insure that the steady state DC voltage level across capacitor 57 will remain essentially constant during the off state of sampler 61. Similarly, the low on state impedance characteristic of the field effect transistor enables the voltage across capacitor 57 to follow that appearing at wiper arm 56 of potentiometer 53. However, other active elements, such as junction transistors, can be employed in place of the field effect transistors. Furthermore, it is not necessary for the voltage across capacitor 57 to remain constant, although, the system accuracy is enhanced if the capacitor voltage remains essentially constant.

The DC control voltage is formed across a 10KΩ resistor 67 connected between the drain electrode 68 of field effect transistor amplifier 66 and a power supply terminal 69. The proper voltage-to-phase relationship is obtained by setting the variable bias control resistor 71 connected between the source electrode 64 and power supply 69 to bias amplifier 66 to the proper operating point.

The offset oscillator 34 is locked to the desired frequency by controlling the DC voltage across a varicap 72 which is in circuit connection with the crystal 73 and associated frequency determining elements of the voltage controlled crystal offset oscillator 34. The DC control voltage issuing from amplifier 66 is coupled across varicap 72 to change its effective capacitance whenever a deviation in the frequency signal appears at the output of mixer 41. Such a deviation will result, for example, from uncontrolled fluctuations in the frequency signal of the offset oscillator 34.

To more fully understand the operation of the phase-to-voltage converter of FIG. 3, attention is directed to both FIGS. 3 and 4. The output frequency signal 80 of mixer 41 for $N=+1$, shown in FIG. 4(A), is coupled across the serially connected sampler 66 and capacitor 57. When the leading edge 81 of a negative pulse 82 from sample pulse generator 43 gates sampler 66 into conduction, the voltage across capacitor 57 attains and follows, for the pulse duration, that voltage at wiper arm 56 of potentiometer 53. This change in DC voltage across capacitor 57 is represented by portion 83 of the DC waveform 84 illustrated in FIG. 4(C). The trailing edge 86 of pulse 82 terminates the conduction of sampler 61 and thereby sets the DC voltage level across capacitor 57 at a percentage of the voltage amplitude 87 of the frequency signal 80 from mixer 41 existing when the negative pulse 82 terminates. (See FIG. 4(B).) If the average voltage which appears across capacitor 57 during each sample period, i.e., 4 milliseconds, is constant from sample to sample, the DC voltage provided by amplifier 66 will be at a level corresponding to an offset oscillator locked condition. To provide a DC voltage to varicap 72 which accurately represents the average voltage appearing across capacitor 57, the output of amplifier 66 is coupled to varicap 72 through a filter 88 which integrates the amplifier output to provide a DC voltage which remains constant as long as the offset oscillator 34 is in a locked condition.

When the frequency of the offset oscillator deviates from the desired frequency 1 mc.+250 c.p.s. for $N=+1$ as given above, for example, to a higher frequency as represented by waveform 80′ or a lower frequency as represented by waveform 80″, the phase point of the frequency signal at which the sample is performed changes each sample interval. Hence, the voltage amplitude 87 of the frequency signal coinciding with the negative sample pulse 82 changes from sample to sample. Consequently, the average voltage level across capacitor 57 changes. For example, in the case where the frequency signal of the offset oscillator 34 deviates to a new higher frequency, the DC voltage across capacitor 57 is set to a corresponding more positive voltage level 91. On the other hand, when the oscillator 34 is offset to a new lower frequency, the DC voltage across capacitor 57 is set to a corresponding less positive voltage level 92.

It should be noted, that the phase-to-voltage converter of FIG. 3 also will correct the frequency signal of offset oscillator 34 to account for uncontrolled fluctuations in the frequencies derived from the primary oscillator 11. Any fluctuation in this frequency signal causes the difference frequency signal 80 from mixer 41 to change, hence the phase of the difference signal coinciding with the sample pulse 82 to change.

As a result of the shift in the average DC voltage across capacitor 57, amplifier 66 generates a DC voltage whose average value is shifted a corresponding amount. This shifted average DC voltage adjusts the capacitance of varicap 72 until the frequency of the offset oscillator 34 is corrected to the desired selected frequency. As noted hereinabove, when the offset oscillator is corrected, the output of mixer 41 will be sampled at the same phase point each time the sample is performed. Hence, the average DC voltage across capacitor 57 will be constant and the average DC voltage output of amplifier 66 will be at a level corresponding to the locked condition of operation for offset oscillator 34.

In practice, it is preferred to limit the amplitude change of the frequency signal 80 during sample pulse interval to a small portion of the peak-to-peak voltage of the frequency signal. This is accomplished by adjusting the pulse width of sample pulse 82 to an interval less than one half the period of the maximum frequency issuing from mixer 41. In this manner, the frequency generated by the offset oscillator 34 can be locked accurately to the desired frequency. In the embodiment illustrated in FIG. 3, the monostable multivibrator sample pulse generator 43 is constructed to supply 40 microsecond wide pulses at intervals of 4 milliseconds. Hence, the mixer frequency signal 80 is sampled for approximately $\frac{1}{100}$ of its total period.

If the offset oscillator 34 is adjusted to provide a frequency signal corresponding to $N=+2$, the mixer 41 will issue a frequency signal 80''' at two times the frequency for the case $N=+1$. As shown in FIG. 4(B), the output of amplifier 66 causes the $N=+2$ frequency signal to shift such that its zero phase point does not coincide with that of the frequency signal 80. This phase shift occurs since the average DC voltage across capacitor 57 must be zero in order for the offset oscillator 34 to be in a locked operating state. Furthermore, since the frequency signal 80''' is sampled at the same phase point each time when the offset oscillator 34 is operating at the desired 1 mc.±250 N c.p.s. frequency, the offset oscillator will achieve a locked condition for any selected N.

Malfunctions in the system for stabilizing the offset oscillator 34 at a selected frequency could cause the generation of a DC control signal which would force offset oscillator to provide a frequency signal which would result in a false lock, i.e., the oscillator 34 locking to a frequency other than the desired frequency required for a highly accurate frequency source. Such a false lock could occur if the offset oscillator 34, adjusted to provide a frequency corresponding to a particular N, were allowed to drift to a frequency corresponding to other values of N. To prevent against such happenings, the bandwidth of the loop including the offset oscillator 34 preferably is adjusted to be less than half the incremental frequency step, i.e., 250 c.p.s. by which the offset oscillator 34 is adjusted. In the embodiment illustrated in FIG. 3, the loop bandwidth is adjusted to be 70 c.p.s. Hence, it is seen that the offset oscillator 34 has a frequency output characteristic composed of 140 c.p.s. corrected frequency bands, in which the offset oscillator 34 functions in the locked state, separated by 110 c.p.s. uncorrected frequency bands in which the offset oscillator 34 functions in the unlocked state.

In order to provide an indication that the offset oscillator 34 is operating in the unlocked state, a buffer amplifier 101 is connected to monitor the output of DC amplifier 66. When the offset oscillator 34 is in the unlocked state, the oscillator 34 varies at some frequency $\Delta f$ as it hunts for a lock frequency. However, loop bandwidth limitations prevent the oscillator 34 from attaining a locked frequency state. Consequently, the sample of the output of mixer 41 is made at different phase points each cycle. This causes the DC voltage across capacitor 57 to vary according to sample phase point variation. This varying DC voltage is detected by buffer amplifier 101 and coupled to a rectifier 102 which responds by providing an unlock alarm signal at terminal 103.

Other malfunctions can occur in the adjustable oscillator stabilizer system of the present invention without causing offset oscillator 34 to hunt, such as failure in the sample pulse generator 43 or in the 1 mc. and offset frequency sources. To provide an indication of such failures, the output of sample pulse generator 43 is coupled to a first rectifier 111 to provide a DC sample alarm voltage. The output of offset oscillator 34 also is coupled to a second rectifier 112 to provide a DC offset alarm voltage. Similarly, the 1 mc. signal is coupled to a third rectifier 113 to provide a DC 1 mc. offset alarm voltage. The DC voltage generated by each rectifier 111, 112 and 113 is coupled to an OR gate consisting of diodes 114, 115 and 116 respectively. The outputs of the OR gate is coupled to the control electrode of an alarm gate 117. The combined output of the OR gates provides a DC voltage which biases the alarm gate 117 to the off-state. However, the absence of any of the DC alarm voltages will cause the combined OR gate output voltage to bias the alarm gate 117 to the on-state, thereby providing a malfunction alarm signal. The output of the alarm gate 117 also could be coupled to terminal 103.

In the embodiment illustrated, frequency offsets in the frequency signal generated by offset oscillator 34 are accomplished by changing crystal 73. In order to provide offsets of ±250 N c.p.s., where N represents an integer in the range of 0 to 40, several crystals are provided cut at frequencies from 1 mc.−250 (40) c.p.s. to 1 mc.+250 (40) c.p.s. in incremental steps of 250 c.p.s. Relative to the $Rb^{87}$ 0→0 transition adjusted hyperfine resonance frequency of 6,834$\frac{24}{35}$ mc., the $\frac{250}{7}$ c.p.s. incremental adjustments made in the frequency transformation performed by frequency synthesizer 13 closely approximately the 50 parts in $10^{10}$ by which it is desired to alter the output frequency of the primary oscillator 11.

While the present invention has been described in detail with reference to one specific embodiment, many modifications are possible within the scope of the invention. Hence, the present invention is not intended to be limited except by the terms of the following claims.

What is claimed is:

1. A frequency adjustable stabilized frequency standard comprising, an atomic frequency resonator providing a signal at a frequency corresponding to a quantum mechanical transition resonance frequency, a principal oscillator for generating an output signal at a first selected frequency, an offset oscillator whose frequency is adjustable in steps of a selected frequency increment for generating an offset signal at a second selected frequency, means for comparing the frequency of said offset signal to a selected fixed reference frequency to lock said offset oscillator to said second selected frequency, means for combining the frequency signals generated by said principal and offset oscillators to provide a synthesized frequency signal for comparison with said frequency corresponding to said quantum mechanical transition resonance frequency, and means for comparing said synthesized frequency with said frequency corresponding to said quantum mechanical transition resonance frequency to generate an error signal for tuning said principal oscillator to said first selected frequency.

2. The apparatus according to claim 1 wherein said means for comparing frequencies to lock said offset oscillator to said second selected frequency includes a phase-to-voltage converter coupled to detect deviations in the phase of a frequency signal derived from said offset oscillator and generate an error voltage signal proportional to the deviation in the phase of said frequency signal from a reference phase point, said error voltage signal coupled to lock said adjustable offset oscillator to said second selected frequency.

3. The apparatus according to claim 2 wherein said phase-to-voltage converter includes means for sampling the phase of a signal derived from said offset oscillator at regular intervals to provide an average DC error voltage signal proportional to the amplitude variation of said frequency signal during the sampling, the rate of sampling being equal to the frequency of the increment by which the offset oscillator is adjusted in steps, said average DC error voltage coupled to lock said adjustable offset oscillator to said second selected frequency.

4. The apparatus according to claim 1 wherein said means for comparing frequencies to lock said offset oscillator includes a sample pulse generator providing a pulse train having a pulse repetition rate equal to the frequency of the increment by which the frequency of the offset oscillator is adjusted in steps, means for deriving a frequency signal from said offset oscillator equal to the total frequency increment by which the offset oscillator is adjusted, an electronic gate coupled to receive said frequency signal derived from said offset oscillator and said pulse train from said sample pulse generator and pass a voltage signal representative of the amplitude variation of said derived frequency signal during each pulse, and means for monitoring said voltage signal to initiate the generation of error voltage signal proportional to deviations in said amplitude variation which occur during successive pulses of said pulse train.

5. The apparatus according to claim 4 wherein the pulse duration is not greater than one-half the period of the derived frequency signal.

6. The apparatus according to claim 5 wherein said offset oscillator, frequency signal deriving means and phase-to-voltage converter defines a feedback loop having a loop bandwidth less than one-half the frequency increment by which the frequency of the offset oscillator is adjusted in steps.

7. The apparatus according to claim 4 wherein said means for deriving a frequency signal from said offset oscillator includes means for transforming the frequency of the output signal of said principal oscillator to a base frequency equal to that frequency about which the offset oscillator is adjusted in steps of a selected frequency increment, and a frequency mixer providing an output signal at a frequency equal to the difference of the frequencies of its input signals, said frequency mixer coupled to receive the base frequency signal and said offset signal and deliver its difference frequency output signal to said electronic gate.

8. The apparatus according to claim 7 further comprising means for monitoring outputs of the offset oscillator, sample pulse generator, electronic gate, and principal oscillator to provide an alarm signal if either the offset oscillator, sample pulse generator, electronic gate or principal oscillator malfunctions.

9. The apparatus according to claim 8 wherein said means for monitoring includes means for sampling the base frequency signal to provide a first DC signal indicative of a correct base frequency signal, means for sampling the offset signal to provide a second DC signal indicative of a correct offset signal, means for sampling the pulse train to provide a third DC signal indicative of a correct pulse train, an electronic gate, an OR gate coupled to receive said first, second and third DC signals and maintain said electronic gate in a selected conduction state as long as said DC signals indicate said sampled outputs are correct, and means for sampling the error voltage signal to provide a fourth DC signal indicative of an unlocked condition of steady state operation of said offset oscillator.

10. The apparatus according to claim 7 further comprising a modulation oscillator for modulating the frequency of the output signal of said principal oscillator to provide a modulated synthesized frequency signal, and wherein said atomic frequency resonator is an optically pumped vapor absorption cell, said modulated synthesized frequency signal is coupled to induce said quantum mechanical transitions the number of which varies in accordance with the frequency of the modulated synthesized frequency signal, and further comprising light sensing means for monitoring the optical pumping of said vapor absorption cell to generate a signal representative of the number and time distribution of said quantum mechanical transitions, said signal coupled to tune said principal oscillator to said first selected frequency.

11. A frequency adjustable stabilized frequency standard comprising, an optically pumped rubidium 87 vapor absorption cell whose atoms are excitable by light to a high energy state, a principal voltage controlled crystal oscillator for generating an output signal at a first selected integral megacycle frequency, a modulation oscillator for modulating the frequency of the output signal of said principal oscillator, a first frequency multiplier for multiplying the frequency modulated output signal, a voltage controlled crystal offset oscillator for generating an offset signal whose frequency is adjustable and equals 1 mc.±250 N c.p.s. where N is an integer adjustable between 0 and 40, a first frequency divider means for dividing the frequency of the principal oscillator, a sample pulse generator responsive to said first frequency divider means to provide a pulse train having a pulse repetition rate of 250 c.p.s., a second frequency divider means for dividing the frequency of the principal oscillator to provide a signal having a frequency of 1 mc., a lower single sideband mixer coupled to receive said 1 mc. and 1 mc.±250 N c.p.s. frequency signals and provide a 250 N c.p.s. signal, an electronic gate coupled to receive said pulse train and said 250 N c.p.s. signal and to pass a voltage signal representative of the amplitude variation of said 250 N c.p.s. signal during each pulse, a capacitor coupled to receive said passed voltage signal to provide a DC error voltage proportional to deviations in said amplitude variations which occur during successive pulses of said pulse train, said DC error voltage coupled to tune said offset oscillator, means for transforming the frequency of the principal oscillator to 1.2 mc., a first upper single sideband mixer coupled to receive the 1.2 mc. and 1 mc.±250 N c.p.s. frequency signals to provide a 2.2 mc.±250 N c.p.s. frequency signal, a divide-by-seven frequency divider coupled to divide said 2.2 mc.±250 N c.p.s. frequency signal, a second upper single sideband mixer coupled to receive and combine an output from said divide-by-seven frequency divider and said principal oscillator, a frequency mixer coupled to receive an output from said frequency multiplier and said second upper single sideband mixer to provide a synthesized modulated frequency signal having a center frequency corresponding to the frequency equivalent to a selected atomic energy state transition from said high energy state, means for coupling said synthesized modulated frequency signal to induce said transitions the number of which varies in accordance with the frequency of the modulation oscillator, a light sensing means for monitoring the optical pumping of said vapor absorption cell to generate an output signal representative of the number and time distribution of said selected atomic energy state transitions, a filter coupled to receive the output signal from said light sensing means and tuned to pass only signals having a frequency equal to said modulation frequency, a phase detector coupled to receive said signals passed by said filter and a signal from said modulation oscillator and compare the phase and amplitude of said signals to generate an error signal to tune said principal oscillator.

References Cited

UNITED STATES PATENTS 3,223,942 12/1965 Smeulers ---------- 331—28 X

14

FOREIGN PATENTS 1,176,184 8/1964 Germany.

ROY LAKE, *Primary Examiner.*

SIEGFRIED GRIMM, *Assistant Examiner.*